United States Patent Office 3,093,642
Patented June 11, 1963

3,093,642
PREPARATION OF CYANURIC CHLORIDE
Herbert Zima, Darmstadt, Germany, assignor to Rohm & Haas G.m.b.H., Darmstadt, Germany
No Drawing. Filed Aug. 11, 1959, Ser. No. 832,913
Claims priority, application Germany Aug. 22, 1958
6 Claims. (Cl. 260—248)

This invention relates to a process for the preparation of cyanuric chloride.

Cyanuric chloride, or 2,4,6-trichloro-1,3,5-triazine,

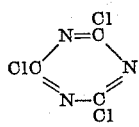

is a material useful in preparing numerous other substances. For example, dyestuffs and dyestuff intermediates can be made by condensation of this reagent with amino-naphthols or amino-azo compounds. The substituted triazines obtained by substitution reactions of cyanuric chloride with phenols, amines, and alcohols can be polymerized with materials such as formaldehyde to form synthetic resins. In the textile industry the reaction products of cyanuric chloride and ethylene imine are used as waterproofing agents. Cyanuric chloride is also used as a starting material in the preparation of a number of bactericidal and therapeutically active compounds, as well as in the preparation of several sulfur containing vulcanisation accelerators and of so called "optic whteners." The same compound can be used to prepare esters of cyanuric acid, which, in turn, are useful as plasticizers and wetting agents.

Cyanuric chloride is the trimer of cyanogen chloride (chlorocyanogen), and has, up till now, been prepared exclusively from this compound. For example, chlorocyanogen can be converted to cyanuric chloride by a gas phase reaction in which chlorine is first reacted with a circulating aqueous solution of hydrogen cyanide. The chlorocyanogen produced is then led over activated charcoal at an elevated temperature.

This process has proved unsatisfactory in the relatively rapid decrease it causes in the optimum efficacy of the catalyst, which decrease in efficency necessitates lengthy catalyst regeneration steps. Furthermore, half of the chlorine used in the preparation of the chlorocyanogen is converted to hydrochloric acid, which is undesirable both for reasons of economy and in view of the corrosion problems which must be overcome.

The present invention pertains to the discovery that cyanuric chloride can be prepared simply and in a manner which avoids the difficulties inherent in the prior art process described. The new method involves passing approximately equimolar portions of cyanogen and chlorine over activated charcoal at temperatures between about 350° C. and about 750° C. A temperature between about 450° and about 550° C. is particularly effective. Also, the efficacy of the catalyst can be increased by preheating it to a temperature between about 800° C. and about 1000° C. in a stream of an inert gas, such as nitrogen. The cyanuric chloride formed in the reaction zone can be recovered as a solid product of almost 100 percent purity by simply cooling the product gas to temperatures below 190° C. Unconverted cyanogen and chlorine are recycled anew through the contact zone. It has proved advantageous to operate with an incomplete conversion of about 60–80 percent of theory and to reintroduce the remaining unreacted cyanogen and chlorine into the gas mixture entering the reaction vessel.

As a catalyst, highly activated charcoal of the type used for gas adsorption, for example that used in filling gas masks, is particularly useful. Advantageously, as much water as possible (preferably to give a water content less than 0.5 percent by weight) is removed from the activated charcoal before loading the reaction vessel or before putting a reactor on stream. Removal of adsorbed water to a level below 0.5 percent by weight is conveniently accomplished by heating the charcoal to a temperature of about 900° C., for example.

The heating of the desorbed charcoal catalyst for contact with the reaction gases can be accomplished in numerous ways already known to the art. For example, there may be external heating of the reaction vessel. Internal heating, for example using resistance heaters, may also be used. A particularly advantageous embodiment used the activated charcoal itself as the resistance element in an electric heater. The reacting gases may be reacted with or without a preheating step. Preferably the ractive gases are mixed before being contacted with the catalyst.

According to the process described, two moles of gaseous cyanuric chloride are formed from three moles of cyanogen and three moles of chlorine, i.e. two moles of product are formed from each six moles of gaseous components. Accordingly, the reaction is furthered by the use of pressures above atmospheric pressure. The reaction adapts itself particularly well to use in a continuous process.

Although the highest yields are expected and are obtained when the reacting gases are initially present in an equimolar mixture, any proportions of the two gases can be used.

The following description of the process is given by way of example, and is not to be considered limiting on the scope and spirit of the invention.

*Example 1*

17.5 liters each of cyanogen and chlorine were passed per hour through a 700 mm. thick layer of commercial grade activated charcoal (containing less than 0.5 percent water) contained in a steel tube of 28 mm. internal diameter. The temperature in the catalyst was held as evenly as possible at 460° C. The reaction product coming from the tube was fed into a cooled separator where it condensed into a white finely crystalline substance. The latter had a melting point of 146° C. and is cyanuric chloride free of impurities.

For a single pass, the conversion to cyanuric chloride was 56.5 percent of theory, calculated either on the amount of cyanogen or of chlorine used. The unreacted portion of the chlorine-cyanogen mixture was recycled from the separator to the reactor.

What is claimed is:
1. The process of making cyanuric chloride by simultaneously contacting chlorine and cyanogen in the gas phase with an activated charcoal catalyst at a temperature from about 350° to about 750° C.
2. The process as in claim 1 in which said temperature is between 450° and 550° C.
3. The process as in claim 1 in which the gases are present at a pressure above atmospheric pressure.
4. The process of making cyanuric chloride which comprises preheating a finely divided activated charcoal catalyst to a temperature from about 800° C. to about 1000° C., and then simultaneously contacting cyanogen and chlorine with said catalyst at a temperature between about 350° C. and about 750° C.
5. The process of making cyanuric chloride which comprises simultaneously contacting cyanogen and chlorine with an activated charcoal catalyst at a temperature between about 350° C. and 750° C., then cooling the reaction mixture to a temperature below 190° C., whereby cyanuric chloride is condensed therefrom, and then re- cycling unreacted cyanogen and chlorine over said catalyst.

6. A process as in claim 5 carried out at a pressure above atmospheric pressure.

References Cited in the file of this patent

FOREIGN PATENTS

| | | |
|---|---|---|
| 126,276 | Australia | Dec. 24, 1947 |
| 602,816 | Great Britain | June 3, 1948 |
| 691,274 | Great Britain | May 6, 1953 |

OTHER REFERENCES

Lewis et al.: Journal of the American Chemical Society, volume 40, pages 472–478 (1918).

Smolin et al.: "s-Triazines and Derivatives," pages 50–51, Interscience Publishers, Inc., February 1959.